June 27, 1967  A. WUNSCHE  3,327,835
APPARATUS FOR CONVEYING WORK PIECES, SUCH AS
CONTAINERS OR THE LIKE
Filed Nov. 15, 1965  2 Sheets-Sheet 1
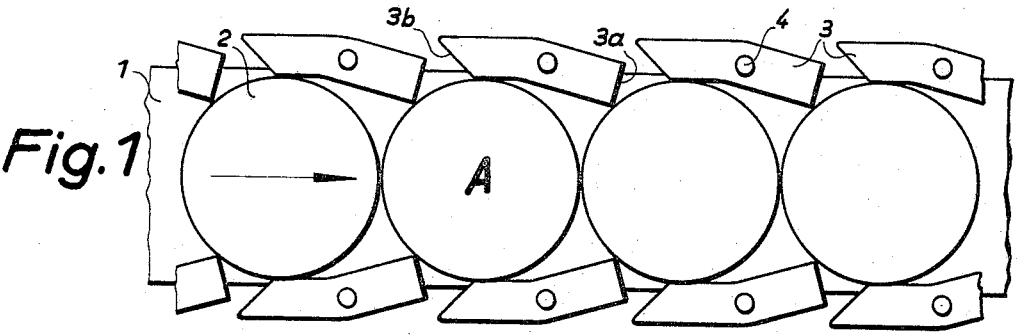
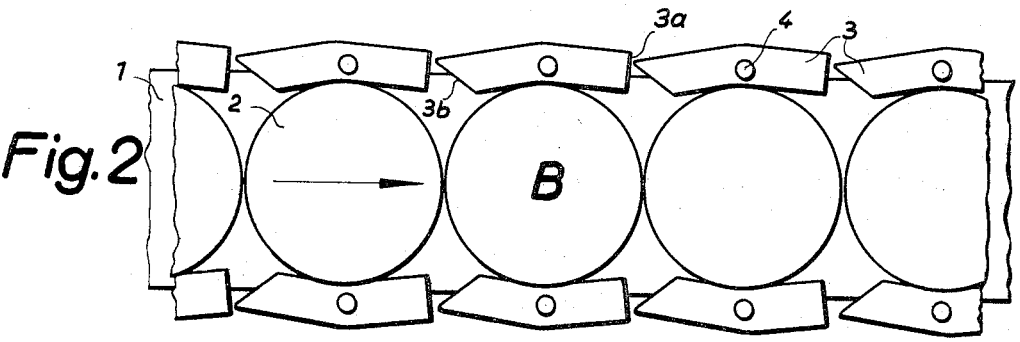
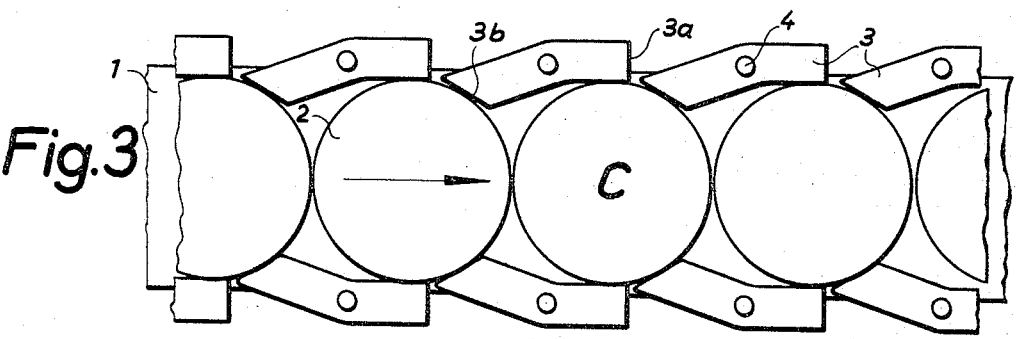
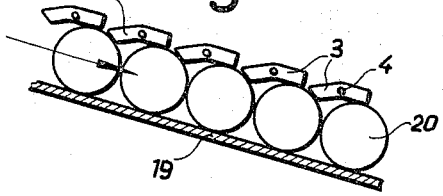

United States Patent Office 3,327,835
Patented June 27, 1967

3,327,835
APPARATUS FOR CONVEYING WORK PIECES, SUCH AS CONTAINERS OR THE LIKE
Arthur Wunsche, Monheim-Baumberg, Germany, assignor to Jagenberg-Werke AG., Dusseldorf, Germany
Filed Nov. 15, 1965, Ser. No. 507,880
Claims priority, application Germany, Dec. 24, 1964, J 27,231
3 Claims. (Cl. 198—34)

ABSTRACT OF THE DISCLOSURE

A conveying apparatus having a longitudinally movable conveyor belt with a plurality of spacer elements disposed on opposite sides thereof. The spacer elements each include a forward and a rearward arm portion which are contacted by articles being conveyed along the belt. When the articles contact the rearward arm portions, the forward arm portions swing inwardly to engage the next advancing articles for the purpose of maintaining the articles in properly spaced arrangement. When the articles are out of contact with the rearward arm portions, the forward arm portions can swing outwardly thereby permitting the articles on the conveyor to advance.

---

Figure 4:
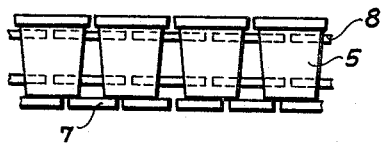

The present invention relates to means for conveying work pieces or articles such as containers and the like with the assistance of a continuously moving conveying means for the articles to be conveyed.

The delivery of containers to filling machines, packing machines, labeling machines and the like, as well as the the feeding of articles to processing and treatment machines, is generally accomplished by endless conveyor belts on which the containers or articles are delivered in a consecutive fashion to the machine. In a known manner in the area of the inlet to the machine there is disposed at the end of the conveying belt a distributing means defined by a worm conveyor, a star wheel or the like and which distributing means regulates the feeding of the articles in dependence on the operating rhythm of the machine and in such connection separates the articles which have reached the distributing means in tight engagement to the spaced interval required for the passage of the articles through the machine. With this type of delivery to the machine it is unavoidable that the relatively long row of articles standing on the endless conveyor belt results in a great pressure being applied to the distributing means located in front of the machine. This pressure which increases with the length of the conveyor belt and the number of work piece standing thereon results, as experience has demonstrated, in considerable wear of the distributing means. Moreover, the aforementioned pressure, in the case of thin-walled containers or bodies, leads to deformation or breakage and, in the case of work pieces or articles with sensitive surfaces, results in damage to such articles. A particular problem arises in the conveyance of conical articles such as cups, and which articles stand on the endless conveyor belt with their lower bottom wall. In such a situation, the pressure has a tendency to move the upright articles out of their vertical position and this change in positional relationship not only causes difficulties on the conveyor belt but also in the area of the distributing means located in front of the machine.

To overcome the above-mentioned difficulties which now exist in the art is the salient object of the present invention.

Broadly, to accomplish the above and other important objects and advantages, the present invention is directed to the concept of locating spacer elements stationarily with respect to the path of movement of the means constituting the conveyor and which spacer elements prevent contact between the work pieces or articles. The spacer elements which are defined by check levers are movable into the path of movement of the work pieces or articles in timed relation to the work piece sequence and the free ends of the check levers, which levers are pivotable about fixed axes of rotation, project or extend alternately into the path of movement of the work pieces. The spacer elements are controlled by the work pieces per se, that is to say, the actuation of the spacer elements occurs automatically by virtue of the forward movement of the work pieces.

More specifically, the arrangement and design of the spacer elements is such that by the forward movement of one work piece or article the blocking or arresting effect applied to the next following work piece or article is terminated and the mode of operation is such that with, for example, the simultaneous removal of five work pieces, the following work pieces will move against a stop and while maintaining their respective distances from each other, occupy the location of the previously removed work pieces or articles.

Figure 5:
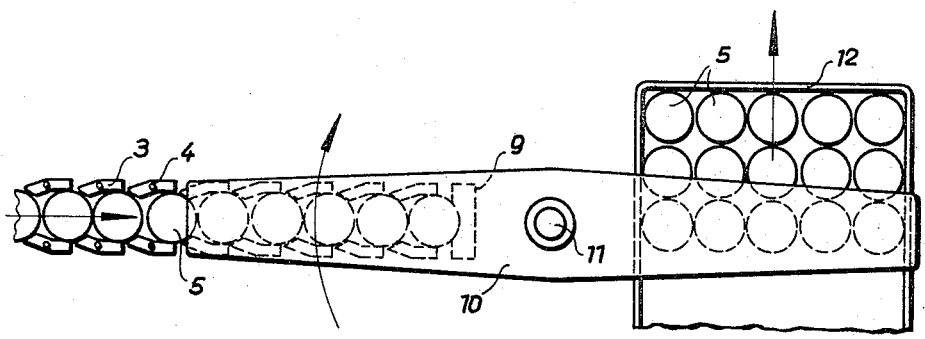
Figure 6:
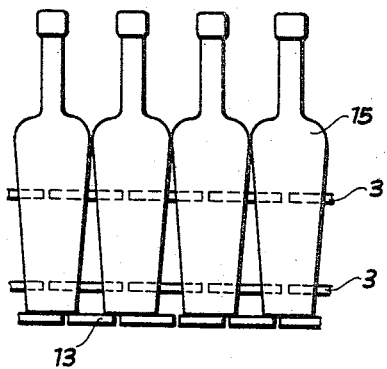
Figure 7:
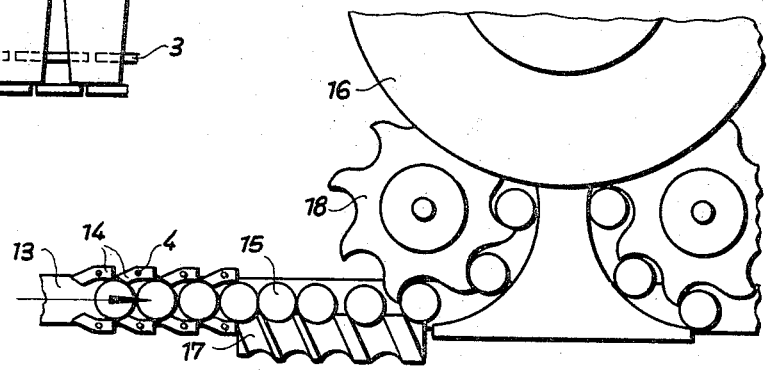

Additional objects and advantages of the present invention will become more fully apparent to one skilled in the art from the ensuing detailed description and annexed drawings, and in which drawings:

FIGURES 1–3 illustrate diagrammatically the arrangement and coaction of the spacer elements in the most important phases of the movement of the work pieces or articles, FIGURE 4 is a view in side elevation of a conveying apparatus embodying the present invention in connection with a machine for delivering groups of cups into a collecting container or receptacle, FIGURE 5 is a top plan view of the arrangement shown in FIGURE 4, FIGURE 6 is a view in side elevation illustrating the utilization of the invention for conveying bottles to a labeling machine, FIGURE 7 is a top plan view of the arrangement shown in FIGURE 6, and FIGURE 8 is a diagrammatic view of an inclined conveyor for cylindrical articles wherein the spacer elements are located above the conveyor.

Referring to the embodiment illustrated in FIGURES 1–3, an endless conveying belt of any suitable convenient type is denoted generally 1 and which is employed for conveying a plurality of work pieces or articles 2 to a point of utilization and spacer elements 3 are mounted on each side of the belt 1 for coaction with the work pieces or articles 2. The spacer elements 3 are constituted by double-armed levers and each lever is pivotally mounted on a stationary axis of rotation denoted 4. Each lever is provided with a forward planar face 3a and a rearward bevelled face 3b. It will be appreciated, therefore, that the spacer elements 3 are stationarily located with respect to the conveyor belt 1.

In order to appreciate more fully the operation of the spacer element 3, attention is directed to FIGURE 1 and particularly the position identified therein as A of the work pieces or articles 2, and in which position the forward ends 3a of the spacer elements project or extend into the path of movement of the work pieces 2 during the course of movement of the belt 1. During the movement of the work pieces toward the point of utilization, it will be noted that the spacer elements 3 are displaced from the position shown in FIGURE 1 into the intermediate position identified B in FIGURE 2, and following further forward movement the spacer elements 3 are moved by virtue of the forward movement of the work pieces 2 into the position illustrated in FIGURE 3 in which the bevelled end portions 3b, which of course are the rear end portions as regards the direction of movement of the conveyor belt 1, project into the path of movement of the work pieces 2. In other words, in this latter position, the bevelled end portions 3b rest against the circumference or peripheral surface of the next following work piece or article 2 and, as a result, prevent the contact of such next following work piece 2 with the preceding work piece.

It is believed readily apparent, therefore, from the above description that the structural details and the arrangement of the spacer elements 3 ensure a proper spacing of the work pieces or articles being moved by the conveyor belt.

With further reference to FIGURES 4 and 5 which pertain to a machine for the automatic delivery of cups 5 into a storage container or receptacle 12, it will be noted that at the end of an endless conveyor belt 7 with which are associated spacers 8 similar to the spacers 3 previously described, there is located a fixed stop 9 for the cups 5. The stop 9 is so arranged that the spacers 8 may assume the position shown in FIGURE 3 as regards the spacers 3 and by virtue of this checked or blocked position maintain a small space or gap between two adjacent cups 5, as is readily apparent from the drawings.

A double-armed head 10 of known type and which is provided with mechanical or pneumatic gripping means (not shown) is mounted on a vertically disposed shaft or axle 11. By means of the head 10 which is capable of upward and downward movement and thereafter pivotal movement in synchronization with the working cycle, it will be appreciated that a group of cups 5 is grasped thereby, lifted from the conveyor belt 7 and, following the pivotal movement of the head 10, deposited into a storage container or receptacle 12.

In FIGURES 6 and 7 there is illustrated an assemblage which may be utilized in connection with a labeling machine or other type of bottle processing machine in which an endless conveying belt 13, similar to either of the belts 1 or 7, is provided with spacer elements 14 of the character shown at 3 in FIGURES 1–3 or 8 in FIGURES 4 and 5. In this particular embodiment, the spacer elements 14 not only offset the effect of the pressure previously described, but additionally by preventing a point-to-point contact between bottles 15 assure the proper vertical position of the bottles.

At the inlet or entrance area of the machine which is indicated generally 16, which is located at the end of the endless belt 13, there is provided a graduated worm conveyor 17 which, by virtue of the spacer elements 14, is not subject to the pressure of the bottles 15. Operably associated with the outlet end, so to speak, of the worm conveyor 16 is a star wheel feeding device 18 which feeds or introduces the bottles 15 into the processing machine 16.

The inventive concept can be further utilized in connection with an inclined conveyor wherein cylindrical work pieces or articles roll in a downward direction via gravity along an inclined track. FIGURE 8 illustrates diagrammatically such an arrangement and in this figure it will be noted that an inclined track is denoted 19, cylindrical work pieces or articles 20 and spacer elements 21. Of course, the spacer elements 21 are similar structurally to the elements 3 and in this embodiment the spacer elements 21 are located at a suitable or convenient distance above the track 19.

The invention is not to be confined to any strict conformity to the showing in the drawings, but changes or modifications may be made therein so long as such changes or modifications mark no material departure from the spirit and scope of the appended claims.

What is claimed is:

1. In a conveying apparatus for delivering a plurality of articles to a desired location, said apparatus including a longitudinally movable planar conveyor belt adapted to support said articles in upstanding position thereon, the improvement for preventing said articles from being longitudinally pressed against one another, comprising:

a plurality of spacer members disposed on opposite sides of said conveyor belt in spaced relation above the plane of said conveyor belt;

means pivotally mounting said spacer members with each spacer member having a pivot axis perpendicular to the plane of said conveyor belt and with all of said pivot axes along each side of said conveyor belt being longitudinally aligned;

said spacer members thus being disposed in at least one plane parallel to the plane of said conveyor belt;

each of said spacer members including angularly disposed first and second arm portions whose inner surfaces subtend between them, an angle of less than 180°;

said conveyor belt being operative to feed said articles longitudinally to advance them from a supply point to a discharge point;

said first arm portion of each spacer member being directed toward said supply point and said second arm portion of each spacer member being directed toward said discharge point;

said first arm portion having a forward face at the end thereof engageable against an advancing article;

said spacer members being arranged in operative pairs on opposite sides of said conveyor belt with each of said pairs having their pivot axes aligned transversely of said conveyor belt;

said pivotal mounting means positioning said spacer members with the inner surfaces of said spacer members being correlated with the transverse width of an article being conveyed whereby, when a selected advancing article contacts the inner surfaces of said second arm portions in any selected pair of spacer members, the forward face of the first arm portions of said selected pair are pivoted inwardly to abut against the next succeeding article being advanced;

said forward faces of said selected pair of spacer members, when abutted against said next succeeding article preventing said next succeeding article from pressing with an undue amount of force against said selected article;

said selected pair of spacer members being further operative, when said selected article is advanced out of contact with said second arm portions, to permit said next succeeding article to pivot said first arm portions outwardly and advance along the inner surfaces thereof;

all of said pairs of spacer members being operative in synchronism whereby each article on said conveyor belt, except the terminal article being discharged, is engaged against the same portion of the spacer members on opposite sides of such article.

2. The improvement defined in claim 1 wherein said forward faces are bevelled outwardly from said inner surfaces of said first arm portions.

3. The improvement defined in claim 1 wherein said first series of spacer members are provided in a first plane disposed above the plane of said conveyor belt and a second series of spacer members are provided in a second and higher plane, whereby advancing articles are engaged by said spacer members at two different locations along their height.

References Cited

UNITED STATES PATENTS 1,819,032   8/1931   Lehman.

EVON C. BLUNK, *Primary Examiner.*

A. C. HODGSON, *Assistant Examiner.*